(12) United States Patent
De La Barré et al.

(10) Patent No.: US 8,441,522 B2
(45) Date of Patent: May 14, 2013

(54) METHOD AND DEVICE FOR THE AUTOSTEREOSCOPIC REPRESENTATION OF IMAGE INFORMATION

(75) Inventors: René De La Barré, Mitweida (DE); Siegmund Pastoor, Berlin (DE); Hans Röder, Berlin (DE)

(73) Assignee: Fraunhofer-Gesellschaft zur Förderung der angewandten Forschung e. V. (DE)

( * ) Notice: Subject to any disclaimer, the term of this patent is extended or adjusted under 35 U.S.C. 154(b) by 251 days.

(21) Appl. No.: 12/682,075

(22) PCT Filed: Nov. 14, 2008

(86) PCT No.: PCT/EP2008/009828
§ 371 (c)(1),
(2), (4) Date: Aug. 9, 2010

(87) PCT Pub. No.: WO2009/062752
PCT Pub. Date: May 22, 2009

(65) Prior Publication Data
US 2010/0295928 A1 Nov. 25, 2010

(30) Foreign Application Priority Data
Nov. 15, 2007 (DE) .......................... 10 2007 055 026

(51) Int. Cl.
*H04N 13/04* (2006.01)
(52) U.S. Cl.
USPC ............... 348/51; 348/42; 348/57; 348/58; 359/462; 359/464; 359/465; 345/8; 345/613
(58) Field of Classification Search ............... 348/51, 348/42, 57, 58; 359/462, 465, 464; 345/613, 345/8
See application file for complete search history.

(56) References Cited

U.S. PATENT DOCUMENTS

| 5,822,117 A | * | 10/1998 | Kleinberger et al. | ......... 359/465 |
| 6,791,570 B1 | * | 9/2004 | Schwerdtner et al. | ........ 345/613 |

FOREIGN PATENT DOCUMENTS

| DE | 19822342 A1 | 12/1999 |
| DE | 102006031799 B3 | 1/2008 |
| EP | 0829743 A2 | 3/1998 |
| WO | WO-9827451 A1 | 6/1998 |
| WO | WO-0118589 A1 | 3/2001 |
| WO | WO-2008003373 A1 | 1/2008 |

OTHER PUBLICATIONS

"International Application Serial No. PCT/EP2008/009828, International Search Report and Written Opinion", (Feb. 18, 2009), 18 pgs.
"International Application Serial No. PCT/EP2008/009828, Preliminary Examination Report dated Nov. 25, 2009", 12 pgs.

* cited by examiner

*Primary Examiner* — Kyung H Shin
(74) *Attorney, Agent, or Firm* — Schwegman Lundberg & Woessner, P.A.

(57) ABSTRACT

A method for the autostereoscopic representation of image information on a matrix screen on which image points are formed through a subpixel group, each with a plurality of subpixels, wherein two stereoscopic fields are imaged on one of two subgroups of the image points, and wherein light emanating from the two subgroups of image points is guided through a barrier raster into two adjacent viewing zones, and wherein a change of the viewer's head position is further detected, and activation of the subpixels is adapted to the change of the head position by shifting intensity centroids, in particular, within the image points upon a change in the viewing distance between the head position and matrix screen by adapting of weightings of intensities within the image points such that a lateral distance between the centroid of the intensity distributions in a left viewing zone and the centroid of the intensity distributions in a right viewing zone in a viewing plane remains constant. A respective device for the autostereoscopic representation of image information is described.

19 Claims, 3 Drawing Sheets

METHOD AND DEVICE FOR THE AUTOSTEREOSCOPIC REPRESENTATION OF IMAGE INFORMATION

PRIORITY CLAIM TO RELATED APPLICATIONS

This application is a national stage application under 35 U.S.C. §371 of PCT/EP2008/009828, filed Nov. 14, 2008, and published as WO 2009/062752 A1 on May 22, 2009, which claims priority to German Application No. 10 2007 055 026.1, filed Nov. 15, 2007, which applications and publication are incorporated herein by reference and made a part hereof in their entirety, and the benefit of priority is claimed thereto.

This document relates to a method for the autostereoscopic representation of image information on a matrix screen according to the preamble of the first claim as well as to a respective device for the autostereoscopic representation of image information.

In an example, a plurality of image points is formed on the matrix screen by one subpixel group each having a plurality of subpixels being modifiable in their intensity and being positioned in rows and columns, wherein two stereoscopic fields are imaged on one of two subgroups a time of the image points, and wherein light emanating from the two subgroups of image points is guided through a barrier raster into two adjacent viewing zones such that the light emanating from the image points of a first one of the two subgroups is incident into a left viewing zone for a left eye, and the light emanating from the image points of a second one of the two subgroups is incident into a right viewing zone for a right eye of a viewer. As a result, a change of a viewer's head position is further detected, and activation of the subpixels is adapted to the change of the head position. Thereby, it is to achieve that stereoscopic vision of the image information, for which each of the two fields must be seen exactly by one of the two eyes, is possible at different head positions and remains maintained also during a head movement. An approach is shown in the document WO 98/27451 A1. The method described therein, however, is only suitable for tracking of a lateral head movement of the viewer.

Thus, the present document does propose a method for the autostereoscopic representation of image information by means of which an adaptation within a greater clearance of the viewer's movement is enabled, wherein this adaptation is furthermore to occur without any jumps being perceptible to the viewer. The present approach can further be based on the desire to develop an appropriate device for the autostereoscopic representation of image information which permits a more flexible adaptation to a varying head position of the viewer.

This is solved in an example by a method having the characterizing features of the first claim in combination with the features of the preamble of the first claim as well as by a device having the features of the independent claim. Preferred embodiments and improvements of the invention result from the features of the independent claims.

With the present approach, a flexible adaptation of the image representation to a change of a viewing distance between the viewer's head position and matrix screen is also enabled in that the subpixels within each of the image points are activated with a line-by-line subpixel dependent weighed intensity in addition to the image information such that an intensity centroid within the respective image point and thus a centroid of a lateral intensity distribution of the light emanating from this image point can laterally be shifted in the corresponding viewing zone, wherein the intensity centroids within the image points are shifted upon a change of the viewing distance by matching the weighting of the intensities such that a lateral distance between the centroid of the intensity distributions in the left viewing zone and the centroid of the intensity distributions in the right viewing zone in a viewing plane varying with the head position remains constant. For adapting to the change of the viewing distance, then a lateral distance each between the intensity centroid within an image point of the first subgroup and the intensity centroid within a nearest image point of the second subgroup corresponding to the respective image point of the first subgroup can be varied. When the barrier raster is positioned between the matrix screen and the viewer, then this advantageously occurs by decreasing said distance while increasing the viewing distance, and by increasing said distance while reducing the viewing distance. For the determination of the varying viewing distance, the viewer's head position can then be detected directly or indirectly wherein the head position has not necessarily to be determined with respect to all degrees of freedom.

With a preferred embodiment of the invention the intensities of the subpixels of all image points are weighed such that, within the viewing plane detected with the head position, the centroids of intensity distributions of light emanating from the different image points of the first subgroup coincide on top of each another in the left viewing zone and the centroids of the intensity distributions of light emanating from the different image points of the second subgroup coincide on top of each other in the right viewing zone. This corresponds to an activation of the matrix screen which is optimized for a head position in which the left eye of the viewer is located in the viewing plane in the common centroid of the intensity distributions of light emanating from the image points of the first subgroup, and the right eye of the viewer is located in the common centroid of the intensity distributions of light emanating from the image points of the second subgroup within the right viewing zone.

In this document, then various centroids of intensities be described yet as coinciding on top of each other which are slightly laterally spaced apart from one another, however, preferably not more than 5 mm, specially preferably not more than 3 mm. With preferred embodiments of the invention, tracking of the representation with a varying viewing distance in the described manner should be possible over a range of various viewing distances which is of at least 30 cm in depth so as to achieve a sufficient insensitivity in view of head movements. The term of intensity centroid or centroid of an intensity each be to understand as the location which results from integrating of location coordinates weighed with the respective radiation power or rather radiation intensity over a (finitely expanded) image point or rather over the viewing plane or that portion of the viewing plane falling into the corresponding viewing zone. Stereoscopic fields as defined by the present document be any images which together with another field of a pair of fields each, are perceptible as a three-dimensional stereoscopic image. With the method described herein, then of course a plurality of stereoscopic images each consisting of two stereoscopic fields in the described manner can also be represented in sequence such as for the reproduction of a 3D film.

In order to additionally ensure continuous tracking of a lateral movement of the viewer, if possible, the intensity centroids can laterally be shifted within the image points upon a lateral change of the head position by adapting the weighting of the intensities in proportion to this change.

An advantageous device for the autostereoscopic representation of image information which is softwarely established to carry out the described method thus comprises a matrix screen with a plurality of subpixels positioned in rows and columns and being variable in their intensity, which are integrated into a plurality of subpixel groups to reproduce one image point each, a barrier raster positioned parallel to the matrix screen by means of which light emanating from the image points is guidable into one of two adjacent viewing zones each, means for detecting the head position of a viewer, and a control device for activating the subpixels of the matrix screen. This device can appropriately be performed in particular for a method of the proposed manner by adequate programming the control device. In order to fulfil its action, for example, the barrier raster may include grid lines, prismatic elements or cylindrical lenses running parallel to a column direction of the matrix screen, wherein the column direction is allowed to run normal to the row direction or obliquely to it as well.

Activating the subpixels within each of the image points with a subpixel-dependently weighed intensity can be implemented by multiplying an intensity value resulting from the image information for one image point for each subpixel of the image point by a value of a weighting function for activating the subpixels, wherein this weighting function is independent of the image information, comprises a form depending on the head position and an location of the image point, and defines for each subpixel of the image point a weight being locus-dependent within each row. The dependence of this weighting functions on the head position can be configured such that, within the image points radiation power remains constant in the laterally shifting location of the intensity centroid at predetermined image information, so that an impression of brightness perceiving from the viewer does not alter with the change of the head position despite of possible shadings of margin areas of the image points. It may also be suitable to configure the weighting functions such that total radiation power of the subpixels of one image point with consistent image information but varying head position of the viewer remains constant. Typically, the loci of intensity centroids coincide with a maximum of the respective weighting function. Where these maxima or rather the intensity centroids are to locate within the individual image points at a predetermined head position and a predetermined interpupillary distance, this will be apparent for one skilled in the art in a simple and unambiguous manner from geometric parameters of the device used, namely in particular from a period length of the barrier raster and a distance between the matrix screen and the barrier raster in addition to the interpupillary distance and the viewing distance. Then, the lateral distance between the centroid of the intensity distributions in the left viewing zone and the centroid of the intensity distributions in the right viewing zone, which remains consistent with a varying viewing distance, should correspond to the interpupillary distance.

With an embodiment of the invention, an average value of 65 mm, for example, corresponding to a population average can be assumed for the interpupillary distance because the viewing zones have a finite extent. On the other hand, an advantageous improvement provides that a lateral interpupillary distance of the viewer is detected in addition to the head position, and that the intensities within the image points are weighed such that the lateral distance between the centroid of intensity distributions in the left viewing zone and the centroid of the intensity distributions in the right viewing zone within the viewing plane, so in a distance corresponding to the viewing distance from the matrix screen or rather from the barrier raster corresponds to the detected interpupillary distance. For that, the used device can additionally include means for detecting an interpupillary distance of the viewer such as with at least one video camera taking a picture of a viewer's face, wherein the interpupillary distance can be determined by evaluating pictures thus collected.

To enable stereoscopic vision as comfortable as possible, in preferred embodiments of the invention, the change of the head position is detected without contact by means of a tracking method. For that, means for detecting the head position may include at least one video camera which is possibly used at the same time for determining the interpupillary distance, wherein the head position is again detected by evaluating pictures collected with it, e.g. by means of a triangulation method when using several cameras.

The activation of the matrix screen can be performed such that in each row of the matrix screen image points of the first subgroup alternate with image points of the second subgroup. Then, a static barrier raster being advantageously simply performed can be used. Alternatively, the image points of the two subgroups can similarly be developed by the same subpixels which are time sequentially activated then to reproduce image points of the two stereoscopic fields alternately, wherein the barrier raster is synchronously switched over between two states in order to guide light emanating from the image points alternately into the left viewing zone for the left eye and into the right viewing zone for the right eye of the viewer.

An advantageous embodiment of the invention provides that the matrix screen is usable to reproduce coloured stereoscopic images. For that, each image point can be developed with at least three rows of subpixels and in each row with at least three subpixels of different colour so that lateral shifting of the intensity centroids will be possible neutral in colour. In order to assure this, preferably a sequence of the colours of the subpixels of each image point is cyclically permuted in the row direction within the image point between the rows then. This again can be achieved, e.g., through an oblique grouping of the columns or through a lateral offset line-by-line of the subpixels of equal colour.

In the following, embodiments of the invention will be described on the basis of FIGS. 1 to 4, in which.

Figure 1:
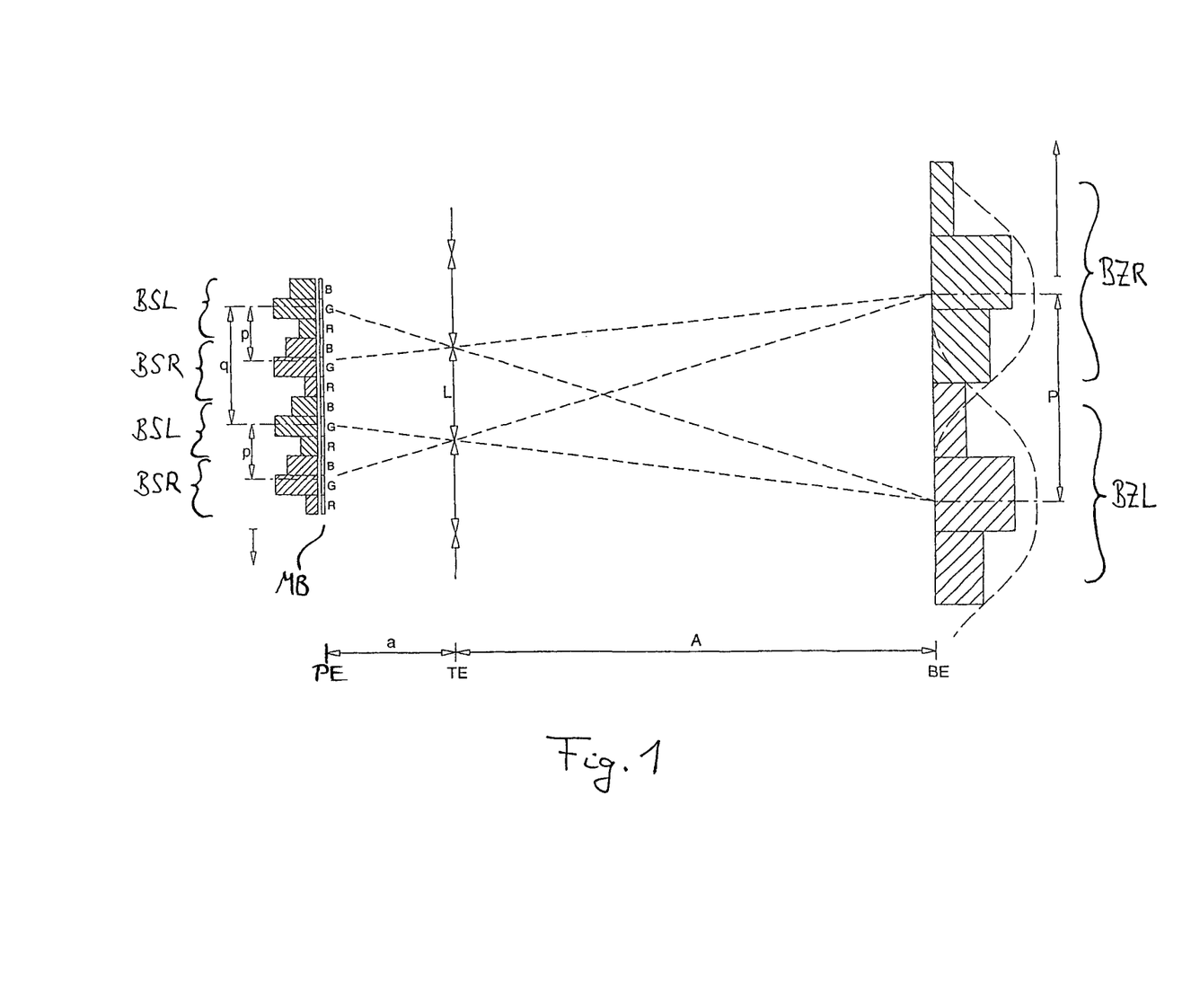
FIG. 1 shows schematically a top view of the design of a device for the autostereoscopic representation of image information in an embodiment of the invention.

The design of an autostereoscopic display is shown in FIG. 1. The display comprises a matrix screen MB having the pixel plane PE in front of which separating members of a barrier raster are positioned in a separating plane TE being parallel to the matrix screen MB. For example, these are slots, prismatic elements or cylindrical lenses being periodically positioned from one another in a distance L. The viewer's eyes are located in a viewing plane BE. The distances between the pixel plane PE, the separating plane TE and the viewing plane BE are identified with "a" and "A". In the pixel plane PE are created image columns alternately, BSR for the right stereo view and BSL for the left stereo view, see also FIG. 2. By the barrier raster it is achieved that light emanating from the image points of the image columns BSR is incident into a right viewing zone BZR for a right eye of a viewer, and light emanating from the image points of the image columns BSL is incident into a left viewing zone BZL for a left eye of the viewer. Herein, the viewing zones BZR and BZL are referred to as stereoscopic zones as well.

The image columns run parallel to the optical elements of the barrier raster (lenses, slots) also referred to as separating raster. Brightness or intensity centroids of the image columns of a stereoscopic pair BSR-BSL have a distance p from each other in the pixel plane PE. The distance from stereoscopic pair to stereoscopic pair is identified with q.

Figure 2:
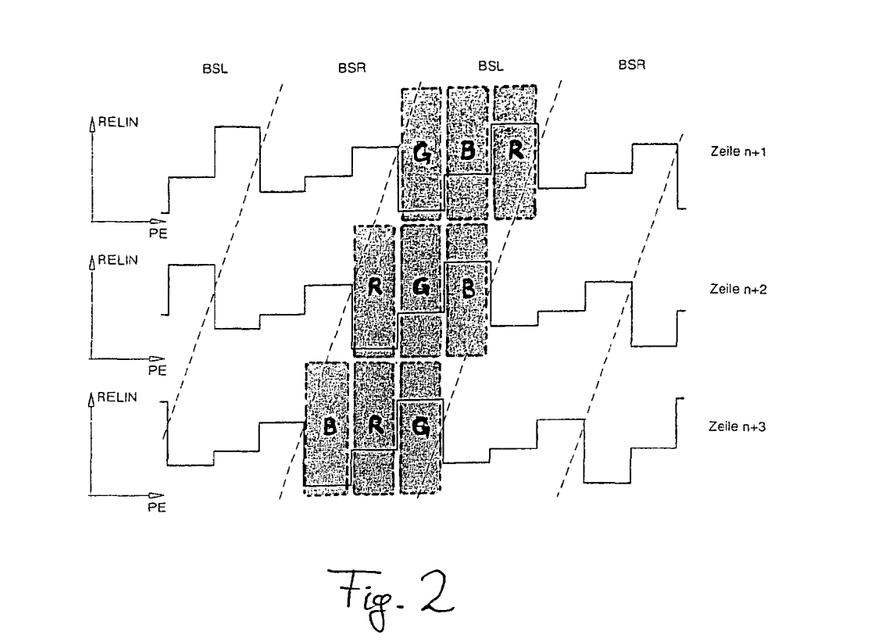
FIG. 2 shows schematically a section from a pixel field of a matrix screen of the device from FIG. 1.

In FIG. 2 is shown a section from the pixel field of a panel forming the matrix screen. Herein, the image columns BSR and BSL for the right and the left stereo views run obliquely over the panel. Nine obliquely positioned coloured subpixels being identified with R for red, G for green, B for blue in FIG. 2 and being variable in the intensity develop one image point each. When viewed from the oblique stereoscopic zones, this arrangement ensures the colour purity of the image points. The brightness of each subpixel is multiplied by a weight. The movement of these weights over the pixel rows is drawn in FIG. 2, wherein RELIN is standing for a relative intensity. This function is equal to all pixel rows but merely offset by one subpixel from row to row.

Alternatively, orientation of the image columns normal to the rows with a sequence of the colours of the subpixels being cyclically transposed from row to row or rather laterally shifted would also be possible. Other arrangements of subpixels towards an image point are also conceivable. In particular, four or more than four subpixels can be included in each row of each image point as well. On the other hand, monochrome subpixels can be used alternatively if colour rendering is renounced. Finally, it is also conceivable to employ a matrix screen with multicoloured pixels in which individual consecutively positioned primary colour pixels each develop one multicoloured pixel acting here as a subpixel and being tunable through the colours. In the last mentioned cases it may be sufficient to provide in one image point only two subpixels in each row and/or to develop one image point only from subpixels lying in a row. However, for the method of centroidal displacement the differences between various possibilities of summarizing subpixels to one image point are of no consequence. Another embodiment of the invention provides that an odd number of subpixels, for example five subpixels, in one row is distributed to one image point each of the two fields. Then, a central subpixel can be assigned to the one field or the other field, depending on the head position and, under certain conditions, can be activated mixed with image information of the two fields. Anyhow, it is conceivable in addition to the displacement of intensity centroids within an image point for tracking the change of the head position which is described first of all herein, also to carry out a new allocation of image information being assigned to one of the fields each into subpixels which become visible to another eye each of the viewer through the typically lateral change. Then, individual subpixels are allowed in the course of change of the head position to possibly be assigned to an image point of the one stereoscopic field at first and afterwards to an image point of the other stereoscopic field.

Through appropriate weighting, thus the brightness centroids or intensity centroids of the image columns can be shifted to the left or to the right in the pixel plane. This results in that the stereoscopic zones move contrarily increased by A/a times as much in the viewing zone BE. If merely the distance q between the image columns will be altered, then the viewing plane BE moves towards or off the display. With the distance p between the brightness centroids a distance P, drawn in FIG. 1, between the stereo channels can be adjusted in the viewing plane which is defined as distance between a centroid of a resulting intensity distribution in the left viewing plane BZL and a centroid of a resulting intensity distribution in the right viewing zone BZR, namely within the viewing plane BE.

Figure 3:
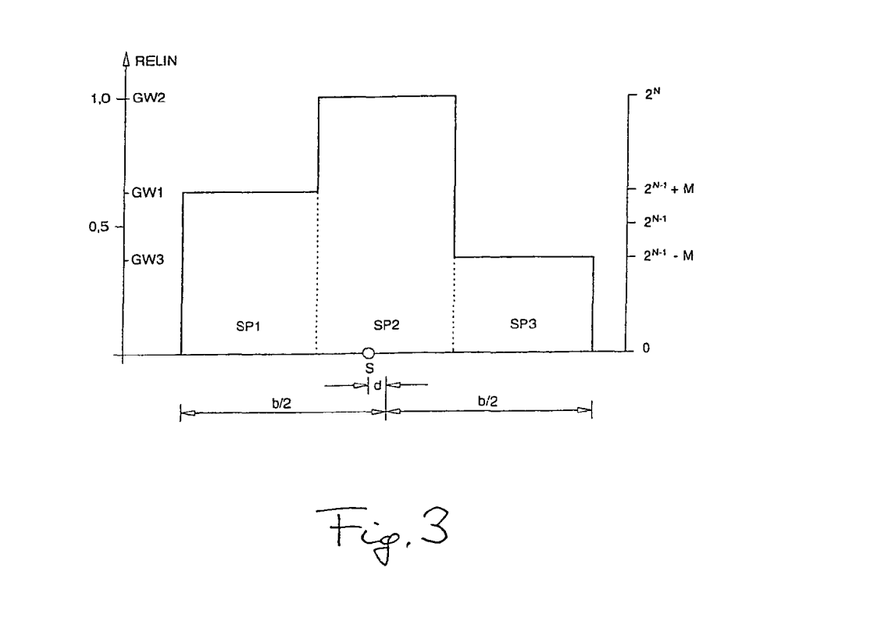
FIG. 3 shows an exemplary course of a weighting on three subpixels defining a row of an image point on the matrix screen.

FIG. 3 shows the course of a weighting of the intensity on a subpixel triple of width b with three subpixels SP1, SP2 and SP3. Due to a digital activation of the subpixels, the weights GW can only be varied in $2^N$ discrete steps herein such that the centroid S can only gradually be shifted as well.

A shift by the full width of a subpixel with the greatest possible pixel brightness is realizable in that case, when the total area below the step waveform is selected to ⅔×b. This corresponds to the area of two subpixels which can completely be transferred either to the both subpixels SP1 and SP2 or to SP2 and SP3. Then, the centroid displaces by b/6 in the one direction or in the other direction, thus in all by the width of a subpixel. The total area below the step trace, thus the brightness and colour of the pixel, nevertheless remains constant.

$$GW1+GW2+GW3=\text{constant}$$

Then, GW1, GW2 and GW3 be applied to the weights GW for the three subpixels SP1, SP2 and SP3. For the displacement d of the centroid from the centre of the image point indicated as pixel centre herein, in the respective row generally applies:

$$d=[(GW3-GW1)/(GW1+GW2+GW3)]\times(b/3)$$

Because of the reference to the pixel centre, the weight GW2 does not influence the position of centroid. The smallest possible displacement depends on the way which the weights will be redistributed: FIG. 3 shows an arrangement in which all $2^N$ possible area proportions being assigned to the central subpixel SP2, and the remaining $2^N$ ones distribute among the two subpixels SP1 and SP3. With symmetric weight distribution the two subpixels being outwardly located comprise $2^{N-1}$ area proportions each. FIG. 3 shows the state wherein, differing therefrom, M proportions have been transferred from SP3 to SP1, thus the weights being distributed as follows:

$$GW1=(b/3)\times(2^{N-1}+M)/2^N$$

$$GW2=(b/3)$$

$$GW3=(b/3)\times(2^{N-1}-M)/2^N$$

Then, M can assume the values of $0\leqq M\leqq 2^{N-1}$. So the centroid moves from the centre of the triple in the direction of SP1 by $$d=M\times b/(3\times 2^N)$$

In this case, the smallest step width equals to $b/(3\times 2^N)$.

Figure 4:
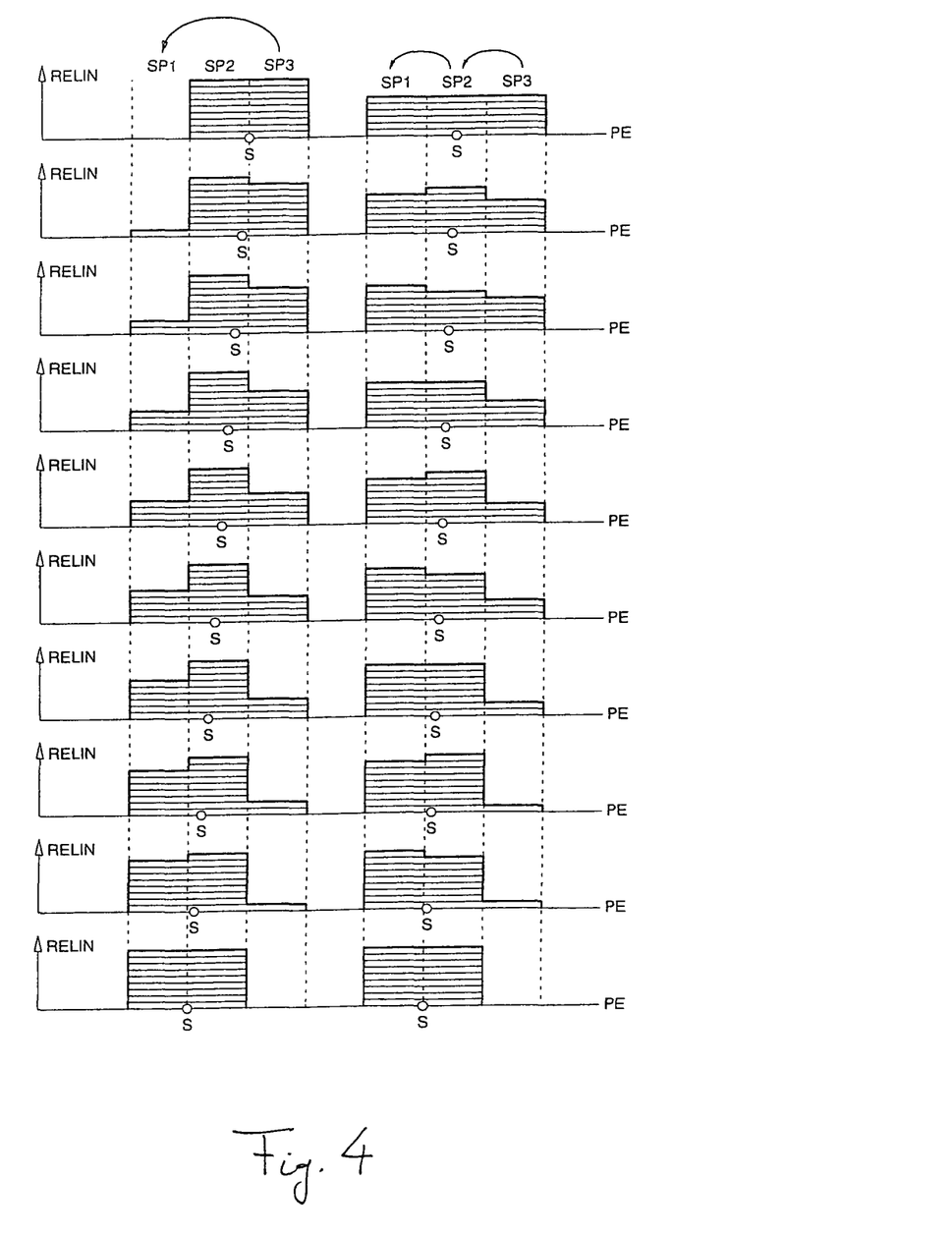
FIG. 4 shows in a diagrammatic illustration corresponding to FIG. 3 two examples for lateral shifting of intensity centroids within an image point.

The centroidal displacement in this approach is outlined on the left side of FIG. 4. Another possibility is shown right in FIG. 4. Then, a portion of SP3 is initially temporarily stored at the central subpixel SP2 and taken to SP1 only in the next step. Then, the centroid moves as half as wide per step, namely by $$d=b/(6\times 2^N)$$

With the embodiment of the method for laterally shifting the intensity centroid within an image point by varying the weighting of the intensities of the respective subpixels, which is illustrated in FIG. 4 on the right side, the alternating distribution of the weights over the subpixels SP1, SP2 and SP3 results in a change of the perceiving brightness during shifting the intensity centroid. However, if required this can be compensated by a dynamic adaptation of the weights.

The step width mentioned at last also results with a great approximation when one area element is taken away from one of the outer subpixels SP1 or SP3 or is added to. Then, the area below the step trace differs from the "set value" of ⅔×b by one area element only. With fine area grading the variation of the pixel brightness accompanying therewith is virtually not perceptible from the viewer.

The step width can still further be refined if shifting of the area elements will be successively distributed among the 3 pixel rows of one image point. For example, one area element can be taken from the left subpixel of row n+1 in FIG. 2 at first, then from the left subpixel of row n+2 and finally from the left subpixel of row n+3. When this is carried out with all image points of an image column, then its centroid shifts by the line being three times smaller $$d=b/(18\times2^N).$$

The described shifting of the intensity centroids in the image points will now be used for lateral and frontal tracking of the stereo zones. With lateral tracking the continuous strips, or to be more specific the intensity centroids, will laterally be shifted in a ratio of a/A in the pixel plane against the viewer's movement. With frontal tracking, between all left and between all right continuous strips BSL/BSR the following distance is adjusted:

$$q=(1+a/A)\times L$$

For an illustrating example the following should apply:

The interpupillary distance amounts to P=65 mm, the pixel pitch or width of the image points in one row amounts to b=0.264 mm. For the nominal viewing distance of A=600 mm, p−b and q=2b should apply. Thus, also the distance L of the strips on the slot mask and the distance a between the panel and slit pattern are determined.

In the following table to be explained more precisely yet, in particular the corresponding distances q of the centroids are listed for a row of viewing distances A:

| A [mm] | ΔA [mm] | q [mm] | Δq [mm] | P [mm] | ΔP [mm] | p [mm] | Δp [mm] | Δp/Δq |
|---|---|---|---|---|---|---|---|---|
| 450 | −150 | 0.528712 | 0.0007 | 49 | −16 | 0.3520 | 0.088 | 123.6 |
| 475 | −125 | 0.528562 | 0.0006 | 51 | −14 | 0.3335 | 0.069 | 123.6 |
| 500 | −100 | 0.528427 | 0.0004 | 54 | −11 | 0.3168 | 0.053 | 123.6 |
| 525 | −75 | 0.528305 | 0.0003 | 57 | −8 | 0.3017 | 0.038 | 123.6 |
| 550 | −50 | 0.528194 | 0.0002 | 60 | −5 | 0.2880 | 0.024 | 123.6 |
| 575 | −25 | 0.528093 | 0.0001 | 62 | −3 | 0.2755 | 0.011 | 123.6 |
| 600 | 0 | 0.528000 | 0 | 65 | 0 | 0.2640 | 0 | |
| 625 | 25 | 0.527915 | −0.0001 | 68 | 3 | 0.2534 | −0.011 | 123.6 |
| 650 | 50 | 0.527836 | −0.0002 | 70 | 5 | 0.2437 | −0.020 | 123.6 |
| 675 | 75 | 0.527763 | −0.0002 | 73 | 8 | 0.2347 | −0.029 | 123.6 |
| 700 | 100 | 0.527695 | −0.0003 | 76 | 11 | 0.2263 | −0.038 | 123.6 |
| 725 | 125 | 0.527632 | −0.0004 | 79 | 14 | 0.2185 | −0.046 | 123.6 |
| 750 | 150 | 0.527573 | −0.0004 | 81 | 16 | 0.2112 | −0.053 | 123.6 |

In the column Δq there is indicated the change of the centroid distance related to the value for the nominal distance. As a result, q has to be varied only very little in order to shift the viewing plane BE defined by a viewer's head position.

The viewing plane BE should be able to be tracked in intervals of approximately 25 mm to 50 mm which, according to table 1, requires arithmetical accuracy of |Δq|<0.0001 mm/2=0.00005 mm for q. However, this does not mean that this close tolerance is required for the position of the continuous strips. This shall be explained in the following:

A horizontal line be running through the oblique pattern of the image columns in the pixel plane PE. The junction of this line with the centroid of the first left image column be now forming the point of reference from which the distances of all the other image columns to the right thereof are measured. The straight lines from the centroids of all the left (right) continuous strips through the centres of the assigned separating elements (lenses, slots) in the separating plane TE all intersect in one point of the viewing plane BE. However, this will be not the case with a real display. It is perfectly acceptable when all straight lines are piercing the viewing plane, for example, at an interval of <2.5 mm from the ideal point. This means that in the pixel plane PE the centroids of the image columns may differ by a/A×2.5 mm=0.010 mm from the set value. Thus, the centroids of the image columns have to be within the following tolerance ranges measured from the point of reference:

$$n\times q\pm 0.010 \text{ mm with } n=1, 2, 3, \ldots$$

Then, q is the exact calculating value. To comply with this tolerance, d≦Δq with Δq=0.010 mm has to be considered. Related to the pixel width, this provides a guideline for the smallest possible grading number N via the condition of b/d≧b/Δq for the step width of d=b/(3×2^N) [according to the first way of centroidal displacement described above]:

$$3\times2^N\geq b/\Delta q$$

With b=0.264 mm and Δq=0.010 mm it follows that $3\times2^N\geq26.4$ or N 3.2. Thus, for the required depth resolution even 4 bits are perfectly enough for the modulation of individual subpixels.

In the column P of the above table the distance of the stereo channels within the viewer's plane BE is mentioned without any tracking of the intensity centroids. These values result when the centroids of the two continuous strips BSR, BSL of a stereo pair are spaced apart from each other by p=q/2 each in the pixel plane PE. Then, the continuous strips on the panel are all equidistant, and as a result crosstalk between the stereo channels is very small. However, due to different interpupillary distances of the viewers such activation would be possible only with very wide stereo channels because in an extreme case otherwise the eyes could no longer see the stereo subpictures simultaneously. So, the channels should have to be wider than the area covered by P in the mentioned table then, thus, according to the table 1 wider than (81 mm−49 mm)=32 mm.

That's why a constant distance P between the stereo channels corresponding to the interpupillary distance is desirable. This can be brought about by adaptation of the strip distance p to the viewing distance A. For this applies:

$$P=a\times P/A$$

The corresponding values are listed in the table above. Accordingly, p varies considerably stronger with the viewing distance than q does. However, the ratio of the two changes is constant and has the value of:

$$\Delta p/\Delta q=P/L=1/2(P/p+1)$$

Then, the last conformity results when the value being valid for the nominal viewing distance is inserted for p on the right side of this equation. The following table indicates the values of p and the accompanying percentage deviations from nominal value of p=0.264 mm to some realistic interpupillary distances P for distances between 450 mm and 750 mm:

| | P | | | | | | | | | |
|---|---|---|---|---|---|---|---|---|---|---|
| | 60 mm | | 62.5 mm | | 65 mm | | 67.5 mm | | 70 mm | |
| A [mm] | p [mm] | Δp % | p [mm] | Δp % | p [mm] | Δp % | p [mm] | Δp % | p [mm] | Δp % |
| 450 | 0.325 | 23 | 0.338 | 28 | 0.352 | 33 | 0.366 | 38 | 0.379 | 44 |
| 425 | 0.279 | 5 | 0.290 | 10 | 0.302 | 14 | 0.313 | 19 | 0.325 | 23 |
| 600 | 0.244 | −8 | 0.254 | −4 | 0.264 | 0 | 0.274 | 4 | 0.284 | 8 |
| 675 | 0.217 | −18 | 0.226 | −15 | 0.235 | −11 | 0.244 | −8 | 0.253 | −4 |
| 750 | 0.195 | −26 | 0.203 | −23 | 0.211 | −20 | 0.219 | −17 | 0.227 | −14 |

With a maximum possible change of the centroid distance from a subpixel width, thus $|\Delta p| \leq 33$ percent, then the stereo channels can be adapted to the interpupillary distance in the whole distance area as long as this being smaller than 65 mm. With greater interpupillary distances the adaptation is difficult merely in the close range.

With the method performed with the device from FIG. 1, now a change of the viewer's head position is detected, namely in the preferred embodiment without contact with a tracking process for which at least one video camera is used for viewing the head position wherein the activation of the subpixels will be adapted to the detected change of the head position during a movement of the viewer. For that, the subpixels within each of the image points are activated with a line-by-line subpixel-dependently weighed intensity in addition to the image information of the two stereoscopic images such that by varying the weighting in the described manner the intensity centroid within the relevant image point and so the centroid of the lateral intensity distribution of the light emanating from this image point can laterally be shifted in the corresponding viewing zone BZR or BZL. The intensity centroids which are indicated with S in FIGS. 3 and 4 and which result from summarizing the local coordinates of the subpixels of the relevant image point weighed with the respective intensities will then be shifted within the image points upon a change the viewing distance A, thus the distance between the head position and matrix screen MB, by adapting the weighting of the intensities such that the lateral distance P between the centroid of the intensity distribution in the left viewing zone BZL and the centroid of the intensity distribution in the right viewing zone BZR within the viewing plane BE varying with the head position remains constant. In particular, in this embodiment the distance P should vary not more than 3 mm from the nominal value of 65 mm during any change of the viewing distance between 450 mm and 750 mm.

The intensities of the subpixels of all image points in the matrix screen MB of FIG. 1 are then weighed such that the centroids of the respective intensity distributions within the viewing plane BE in the viewing zones BZR and BZL each all are in coincidence. When a lateral movement of the viewer is detected then the intensity centroids within the image points are laterally shifted for tracking in proportion to a lateral change of the head position such that the centroids of the intensities in the viewing zones BZR and BZL are always in coincidence at least roughly with the positions of the two eyes of the viewer.

With a preferred improvement of the embodiment which has been described according to FIGS. 1 to 4, a lateral interpupillary distance of the viewer is also determined in addition to the head position, in fact preferably with the video cameras which are used for detecting the head position as well. The intensities within the image points are then weighed such that the lateral distance P between the centroid of the intensity distributions in the left viewing zone BZL and the centroid of the intensity distributions in the right viewing zone BZR within the viewing plane BE corresponds to the determined interpupillary distance.

The subpixels of the matrix screen MB are activated for the autostereoscopic representation of image information which are to discern three-dimensionally from the viewer by multiplying, within each of the image points, an intensity value for each subpixel of the respective image point resulting from the image information by the relevant weight GW, wherein the weights GW can be interpreted as values of a weighting function for each image point illustrated in FIGS. 2 to 4, and wherein these weighting functions being independent from the image information and comprising a form being dependent on the head position and on a location of the image point.

Another embodiment of the invention which forms an alternative to the device described according to FIG. 1 provides that the barrier raster can be switched synchronizedly with the subpixels of the matrix screen MB between two states in order to alternately guide light emanating from the image points into the left viewing zone BZL and the right viewing zone BZR. Then, the image points of the stereo image for the left eye and the image points of the stereo image for the right eye, unlike with the embodiment described before, will be developed by the same subpixels, which will be activated for it in a time sequential manner, namely synchronous with switching-over the barrier raster between the two states.

With the present approach, thus a method is proposed which ensures fluent continuous electronic image tracking without any switching-over effects during all head movements of the viewer in parallel and spaced to the matrix screen MB with consistently high imaging quality with regard to the image definition, channel crosstalk or other interference effects. This method has the advantage of adapting the distance between the effective centroids, thus the locations of highest radiation intensity, in the viewing zones BZL and BZR for the left and the right viewer's eye to the interpupillary distance of the viewer, and of maintaining constant during changes of the viewer's distance. The method can be implemented in a simple manner through adequate programming of a control means activating the matrix screen MB. As a result, the method can simply and cost-effectively be transformed wherein it is able to advantageously work in real time and is interference-proof. Thus, tracking with autostereoscopic displays is implemented with the invention wherein the viewer keeps a stereoscopic image impression even with position changes.

Through the method described herein, then the area enlarges in which the stereoscopic image can be discerned in good quality. In preferred embodiments of the invention it is of particular advantage that persons with different interpupillary distances are even able to discern the stereoscopic effect in an equally good manner. The present approach can be used in an advantageous manner for many various applications such as in combination with gaming, minimally invasive surgery, multimedia, VR, advertising, remote control systems and educational uses such as in museums.

The device proposed with the present document, as can be put in illustrative overview, thus comprises a matrix screen MB with a plurality of subpixels arranged in rows and columns and being changeable in their intensity, which are integrated into a plurality of subpixel groups for reproducing an image point each, a barrier raster positioned parallel to the matrix screen MB as well, by means of which light emanating from the image points can be guided into one of two adjacent viewing zones BZL and BZR each as well as means for detecting a viewer's head position and control means for activating the subpixels of the matrix screen MB. Then, the image points each are assigned to one of two subgroups, wherein these subgroups are defined in that the light emanating from the image points of the one subgroup is incident through the barrier raster into the left viewing zone BZL for a left viewer's eye, and the light emanating from the image points of the other subgroup is incident through the barrier raster into the right viewing zone BZR for a right viewer's eye.

This device is preferably arranged to carry out the described method for the autostereoscopic representation of image information by programming the control means to perform the following steps:

Activating the matrix screen such that two stereoscopic fields will be imaged on one of the two subgroups each of image points wherein the subpixels within each of the image points are activated using respectively one image point dependent weighting function with a line-by-line subpixel-dependently weighed intensity in addition to the image information in such a manner that an intensity centroid S within the respective image point and thus a centroid of a lateral intensity distribution of the light emanating from this image point can laterally be shifted in the corresponding viewing zone BZL or BZR by varying the weighting function;

Evaluating of information determined by the means for detecting the head position about a viewing distance A between the head position and the matrix screen MB;

Adapting the activation of the subpixels when a change of the viewing distance A is being ascertained by shifting the intensity centroids S within the image points by adapting the weighting functions such that a lateral distance P between the centroid of the intensity distributions in the left viewing zone BZL and the centroid of the intensity distributions in the right viewing zone BZR in a viewing plane BE varying with the viewing distance A remains constant as far as possible.

The intensity by means of which any subpixel is activated, so arises from multiplication of an intensity then resulting from the image information for the image point to which this subpixel is assigned, by a value assigned to this subpixel of the weighting function assigned to this image point. For the adaptation to a change of the head position now the weighting functions are modified such that the intensity centroids S laterally shift within an image point. Such adaptation will be performed in particular upon a change of the viewing distance A, namely such that a distance p between the intensity centroid S of an image point radiating into the viewing zone BZL and the intensity centroid S of the respective image point radiating into the other viewing zone BZR is changing. As a result, the distance p will be changed such that the lateral distance P between the centroid of the intensity distribution which is caused by the first mentioned image point in the left viewing zone BZL, and the centroid of the intensity distribution which is caused by the second image point in the right viewing zone BZR, possibly remains constant in the viewing plane BE being remote by the viewing distance A from the matrix screen MB (e.g. from the pixel plane PE or from the barrier raster) and varying with A. How the value of p has to be changed for that results from simple trigonometric calculations which will be obvious to those skilled in the art without difficulty from the geometric connections which, e.g., are illustrated in FIG. 1.

The abbreviations and symbols used above are summarized for the sake of clarity in the following table 3, and are shortly explained once again:

a distance between the matrix screen and barrier raster
A viewing distance (viewer distance to the matrix screen)
R red
G green
B blue
MB matrix screen
PE pixel plane
TE separating plane
BE viewing plane
BSL image column from the left view
BSR image column from the right view
BZL left viewing zone
BZR right viewing zone
b pixel width or image point width, herein the width of a subpixel triple
SP colour subpixel
n number of the pixel row
GW weight
N grading of the weights
M proportions of intensity
RELIN relative intensity (brightness)
d centroidal displacement from the pixel centre
S intensity centroid (centroid of the image column)
p centroid distance between the image columns for the left and right views
q distance of the centroids between the image columns of a single view
L distance of the slits or cylindrical lenses from each other (pitch)
P distance of the stereo channels in the viewer plane

What is claimed is:

1. A method for the autostereoscopic representation of image information on a matrix screen, on which a plurality of image points is formed using a subpixel group having a plurality of subpixels being modifiable in their intensity and being positioned in rows and columns, wherein two stereoscopic fields are imaged on one of two subgroups each of the image points, and wherein light emanating from the two subgroups of image points is guided through a barrier raster into two adjacent viewing zones such that the light emanating from the image points of a first one of the two subgroups is incident into a left viewing zone for a left eye, and the light emanating from the image points of a second one of the two subgroups is incident into a right viewing zone for a right eye of a viewer, wherein a change of a head position of the viewer is further detected, and activation of the subpixels is adapted to the change of the head position, wherein said subpixels within each of the image points are activated with a line-by-line subpixel-dependently weighed intensity in addition to the image information such that an intensity centroid within the respective image point and thus a centroid of a lateral intensity distribution of the light emanating from this image point can laterally be shifted in the corresponding viewing zone by varying the weighting, wherein the intensity centroids within the image points are shifted upon a change of a viewing distance between the head position and matrix screen by matching the weighting of the intensities such that a lateral distance between said intensity centroid within an image point of said first subgroup and said intensity centroid within a nearest image point of said second subgroup is varied and such that a lateral distance between the centroid of the intensity distributions in the left viewing zone and the centroid of the intensity distributions in the right viewing zone in a viewing plane varying with the head position remains constant.

2. The method according to claim 1, wherein said intensities of said subpixels of all image points will be weighed such that, within said viewing plane detected with said head position, said centroids of said intensity distributions of the light emanating from the various image points of the first subgroup coincide on top of each other in said left viewing zone, and said centroids of the intensity distributions of the light emanating from said various image points of the second subgroup coincide on top of each other in said right viewing zone.

3. The method according to claim 1, wherein said intensity centroids within said image points will laterally be shifted upon a change of said head position by adapting the weighting of said intensities proportional to this change.

4. The method according to claim 1, wherein, for tracking said change of said head position, a new assignment of image information to subpixels is additionally carried out which, through said change, will be visible to another viewer's eye.

5. The method according to claim 1, wherein, for activating said subpixels with said subpixel-dependently weighed intensity within each of said image points, an intensity value resulting from said image information for each image point for each subpixel of said image point will be multiplied by a value of a weighting function, wherein said weighting function being independent from said image information and having a form depending on said head position and location of said image point, and defining a weight being locus-dependent within each row for each subpixel of said image point.

6. The method according to claim 1, wherein a lateral interpupillary distance of the viewer will be determined in addition to said head position, and said intensities within said image points will be weighed such that said lateral distance between said centroid of said intensity distributions in said left viewing zone and said centroid of said intensity distributions in said right viewing zone corresponds to the determined interpupillary distance within said viewing plane.

7. The method according to claim 1, wherein, in each row of said matrix screen, image points of said first subgroup alternate with image points of said second subgroup.

8. The method according to claim 1, wherein said image points of said two subgroups are formed by said same subpixels which will be time-sequentially activated for that, wherein said barrier raster is synchronously switched over between at least two states for that.

9. The method according to claim 1, wherein each image point includes at least three rows of subpixels and at least three subpixels of different color in each row.

10. The method according to claim 9, wherein a sequence of colors of said subpixels of each said image point is cyclically permuted in the row direction within said image point between the rows.

11. The method according to claim 1, wherein said change of said viewer's head position is detected without contact with a tracking method.

12. A device for the auto stereoscopic representation of image information comprising a matrix screen with a plurality of subpixels, positioned in rows and columns and being variable in their intensity, which are integrated into a plurality of subpixel groups for reproducing one image point each;

a barrier raster positioned in parallel to the matrix screen such that light emanating from the image points is guidable into one of two adjacent viewing zones, respectively;

a camera or other means for detecting a viewer's head position; and a control device for activating said subpixels of said matrix screen;

wherein said device is configured to provide autostereoscopic representation of image information on a matrix screen, on which a plurality of image points is formed using a subpixel group having a plurality of subpixels being modifiable in their intensity and being positioned in rows and columns, wherein two stereoscopic fields are imaged on one of two subgroups each of the image points, and wherein light emanating from the two subgroups of image points is guided through a barrier raster into two adjacent viewing zones such that the light emanating from the image points of a first one of the two subgroups is incident into a left viewing zone for a left eye, and the light emanating from the image points of a second one of the two subgroups is incident into a right viewing zone for a right eye of a viewer, wherein a change of a head position of the viewer is further detected, and activation of the subpixels is adapted to the change of the head position, wherein said subpixels within each of the image points are activated with a line-by-line subpixel-dependently weighed intensity in addition to the image information such that an intensity centroid within the respective image point and thus a centroid of a lateral intensity distribution of the light emanating from this image point can laterally be shifted in the corresponding viewing zone by varying the weighting, wherein the intensity centroids within the image points are shifted upon a change of a viewing distance between the head position and matrix screen by matching the weighting of the intensities such that a lateral distance between said intensity centroid within an image point of said first subgroup and said intensity centroid within a nearest image point of said second subgroup is varied and such that a lateral distance between the centroid of the intensity distributions in the left viewing zone and the centroid of the intensity distributions in the right viewing zone in a viewing plane varying with the head position remains constant.

13. The device according to claim 12, wherein said barrier raster includes grid lines, prismatic elements or cylindrical lenses running parallel to a column direction of said matrix screen.

14. The device according to claim 12, wherein said camera or other means for detecting said head position includes at least a video camera for non-contact tracking.

15. The device according to claim 12, wherein it further includes a camera or other means for determining the interpupillary distance of said viewer.

16. The device according to claim 12, wherein, in each row of said matrix screen, image points of a first subgroup alternate with image points of a second subgroup wherein light emanating from said image points of the first subgroup is guided through the barrier raster into a left viewing zone for a left eye, and light emanating from said image points of said second subgroup is guided into a right viewing zone for a right eye of the viewer.

17. The device according to claim 12, wherein said barrier raster is capable of being switched over in a synchronized manner with said subpixels of said matrix screen between two states in order to guide light emanating from said image points alternately into a left viewing zone for a left eye, and into a right viewing zone for a right eye of the viewer.

18. The device according to claim 12, wherein each image point includes at least three rows of subpixels and at least three subpixels of different color in each row.

19. The device according to claim 18, wherein a sequence of colors of said subpixels of each image point is cyclically permuted in the row direction within said image point between said rows.

* * * * *

UNITED STATES PATENT AND TRADEMARK OFFICE
CERTIFICATE OF CORRECTION

| | | |
|---|---|---|
| PATENT NO. | : 8,441,522 B2 | Page 1 of 1 |
| APPLICATION NO. | : 12/682075 | |
| DATED | : May 14, 2013 | |
| INVENTOR(S) | : René De La Barré et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 440 days.

Signed and Sealed this
Eighteenth Day of March, 2014

Michelle K. Lee
*Deputy Director of the United States Patent and Trademark Office*